United States Patent
Hung

(10) Patent No.: US 9,645,036 B2
(45) Date of Patent: May 9, 2017

(54) METHOD OF INSPECTING PRESSURE SWITCH

(71) Applicant: Fei-Che Hung, Taoyuan (TW)

(72) Inventor: Fei-Che Hung, Taoyuan (TW)

( * ) Notice: Subject to any disclaimer, the term of this patent is extended or adjusted under 35 U.S.C. 154(b) by 93 days.

(21) Appl. No.: 14/809,510

(22) Filed: Jul. 27, 2015

(65) Prior Publication Data

US 2017/0030794 A1    Feb. 2, 2017

(51) Int. Cl.
*G01R 31/00* (2006.01)
*G01L 27/00* (2006.01)

(52) U.S. Cl.
CPC ................... *G01L 27/007* (2013.01)

(58) Field of Classification Search
CPC ........... H01L 21/6833; H01L 22/12; H01L 21/67288; G01N 2030/025; G01N 30/30; G01N 35/00663; G01L 27/002
USPC ........ 324/500, 750.01, 750.02, 76.11, 76.79, 324/76.81, 756.02, 750.14–750.19, 526
See application file for complete search history.

(56) References Cited

U.S. PATENT DOCUMENTS 5,030,197 A * 7/1991 Kageyama .......... A61M 1/1086
600/16

* cited by examiner

*Primary Examiner* — Melissa Koval
*Assistant Examiner* — Trung Nguyen
(74) *Attorney, Agent, or Firm* — Chun-Ming Shih; HDLS IPR Services

(57) ABSTRACT

A method of inspecting pressure switch for inspecting if stability and the pressure switch's setpoint are within the standard range includes steps of: providing a standard pressure generator and a pressure detector, and connecting the standard pressure generator to the pressure switch and the pressure detector. Then, provide an inspector, and create data which includes a setpoint pressure value and a pressure switch operation condition. Next, electrically connect the inspector to the pressure switch and the pressure detector. Next, standard pressure generator applies pressure on the pressure detector and the pressure switch. Record the set pressure value and the reset pressure value of the pressure switch and calculate error values between the set pressure value, the reset pressure value and the default pressure value, and judge if stability and the pressure switch's setpoint are within the standard range according the error values.

8 Claims, 4 Drawing Sheets

```
                                              ┌── 420
              Switch Calibration Record
     421 ─┐                             ┌── 432
 Engineering Name Column: _____ judge result: Qualified
 Basic Data:       ┌── 422      423        ┌── 427    428
 Apparatus Number Column: 11MBR10CP081  Pressure Unit Column: mbar
 Apparatus Category Column: Pressure Switches  Operate Category Column: INC(High)
 Apparatus Brand Column: BETAB     Operate Condition Column: Normal Close  ── 429
 Setpoint Column: 48               Admissible Error Column: 2.00%          ── 430
 Detected Input Column: (0~100)mbar  Environment Column: 25°C, 45%RH       ── 431
                              ── 426
          425          424
```

FIG.3

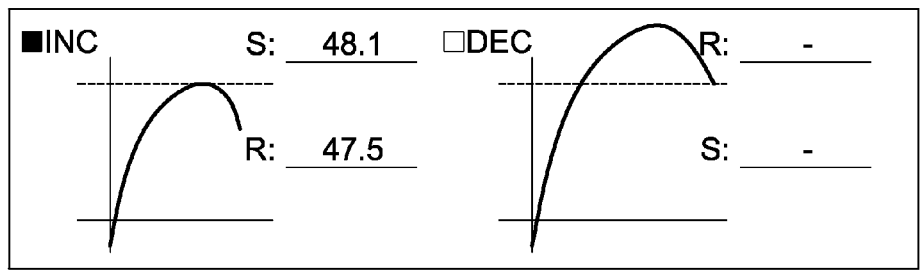

FIG.4

Switch Calibration Record

Engineering Name Column: _____ judge result : __Qualified__

Basic Data:

Apparatus Number Column: __11MBR10CP081__  Pressure Unit Column: __mbar__

Apparatus Category Column: __Pressure Switches__  Operate Category Column: __INC(High)__

Apparatus Brand Column: __BETAB__  Operate Condition Column: __Normal Close__

Setpoint Column: __48__  Admissible Error Column: __2.00%__

Detected Input Column: __(0~100)mbar__  Environment Column: __25°C, 45%RH__

Calibration Data:

Maximum Error: -1.2%

■ INC(High)

| Serial Number | Set(mbar) | Reset(mbar) | Error(%) |
|---|---|---|---|
| 1 | 46.8 | 46.1 | -1.2% |
| 2 | 47.5 | 46.9 | -0.5% |
| 3 | 48.1 | 47.5 | 0.1% |

☐ DEC(Low)

| Serial Number | Set(mbar) | Reset(mbar) | Error(%) |
|---|---|---|---|
| 1 | - | - | - |
| 2 | - | - | - |
| 3 | - | - | - |

■INC   S: __48.1__   ☐DEC   R: __-__

R: __47.5__   S: __-__ tester: _____

FIG.5

METHOD OF INSPECTING PRESSURE SWITCH

BACKGROUND OF THE INVENTION

Field of the Invention

The prevention relates to an inspecting method, in particular relates to a method of inspecting if stability and the setpoint of pressure switch are within the standard range.

Description of Prior Art

In the fluid circuit of an actuator used for supplying fluids from a fluid pressure source to an air cylinder, a pressure switch is provided for inspecting the fluid pressure in fluid paths and for driving and controlling fluid pressuring source as well as fluid pressure machines etc. via signals from the pressure switch.

However, the precision and default values of the pressure switch are declined after the pressure switch is used for a long time. In order to eliminate the error between field setpoint and factory setpoint of a pressure switch which lead to incorrect pressure values and incorrect operations, the pressure switch has to be inspected periodically.

SUMMARY OF THE INVENTION

In terms of prior arts, one of the objectives of the present invention is to provide a method for inspecting a pressure switch. The method is illustrated with basic principles and operation flow easily understood by a layman. The method is useful for immediate judging if the switch is working or malfunctioned which eliminates man errors and is time saving.

An embodiment according to the technologies disclosed in the invention provides a method of inspecting a pressure switch. The method is used for inspecting a pressure switch. The a method of inspecting pressure switch comprises following steps: a) provide a standard pressure generator and a pressure detector, and respectively connect the pressure switch and the pressure detector to the standard pressure generator; b) provide an inspector, and creating a plurality of data in the inspector, wherein the data comprises a setpoint pressure value and a pressure switch operation condition; c) electrically connect the inspector and the pressure switch to the pressure detector; d) standard pressure generator applies pressure on the pressure detector and the pressure switch; d) record a set pressure value and a reset pressure value of the pressure switch; f) calculate error values between the set pressure value, the reset pressure value and the default pressure value; and g) judge if the pressure switch is qualified or not qualified according to the error values.

When the inspector creates the data in step b, the inspector displays the created data screen. The columns of the created data screen comprises an engineering name column, an apparatus number column, an apparatus category column, an apparatus brand column, a setpoint column, a detected input column, a pressure unit column, an operate category column, an operate condition column, an acceptable error column and an environment column. The default pressure value is created in the setpoint column, and the pressure switch operation condition is created in the operate category column.

In other embodiments according to the technologies disclosed in the invention, after step f, a method further comprises following steps: f1) judge if the inspection performed three times; f2) after step f1, if the inspection is not performed three times, the method moves to step d; and f3) after step f1, if the inspection is performed three times, the method moves to step g, judge if the pressure switch is qualified according to the error value.

In other embodiments according to the technologies disclosed in the invention, a method further comprises a following: step h) display an inspection chart comprising the set pressure value, the reset pressure value and error value.

In other embodiments according to the technologies disclosed in the invention, a method further comprising a following step before step e: e0) record an immediate pressure value of the standard pressure generator; and the method further comprising a following step after step g: g0) draw an inspection curve according to the set pressure value, the reset pressure value and the immediate pressure value.

In addition, in embodiments according to the technologies disclosed in the invention, an inspector comprises a microprocessor, a control interface, a storage unit, a display and an output interface. The control interface electrically connects to the microprocessor and is used for creating the plurality of data; storage unit electrically connects to the microprocessor and is used for saving a set pressure value, a reset pressure value, an error value and an immediate pressure value; display electrically connects to the microprocessor, and is used for displaying the inspection chart and the inspection curve; and output interface electrically connects to the microprocessor, and is used for outputting an inspection chart and an inspection curve. The pressure detector electrically connects to the microprocessor, and the pressure detector connects to the standard pressure generator which is used for inspecting the immediate pressure value of the standard pressure generator.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

FIG. 3 is a schematic diagram of a created data screen according to the present invention;

FIG. 4 is a schematic diagram of a calibration curve of a pressure switch according to the present invention;

FIG. 5 is a schematic diagram of an inspection report of a pressure switch according to the present invention.

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

A pressure switch can be utilized in electronic devices such as a pumping pump, a steam boiler, a pneumatic device or a hydraulic device. The pressure switch generates opening or closed circuits via fluid pressure changes in order to control on or off of electronic devices electrically connected to the pressure switch.

The method of inspecting a pressure switch applies pressure on a pressure switch and inspect if the pressure switch is able to close or open at the default pressure value, and further judges if stability and a setpoint of the pressure switch is within the standard range.

Figure 1:
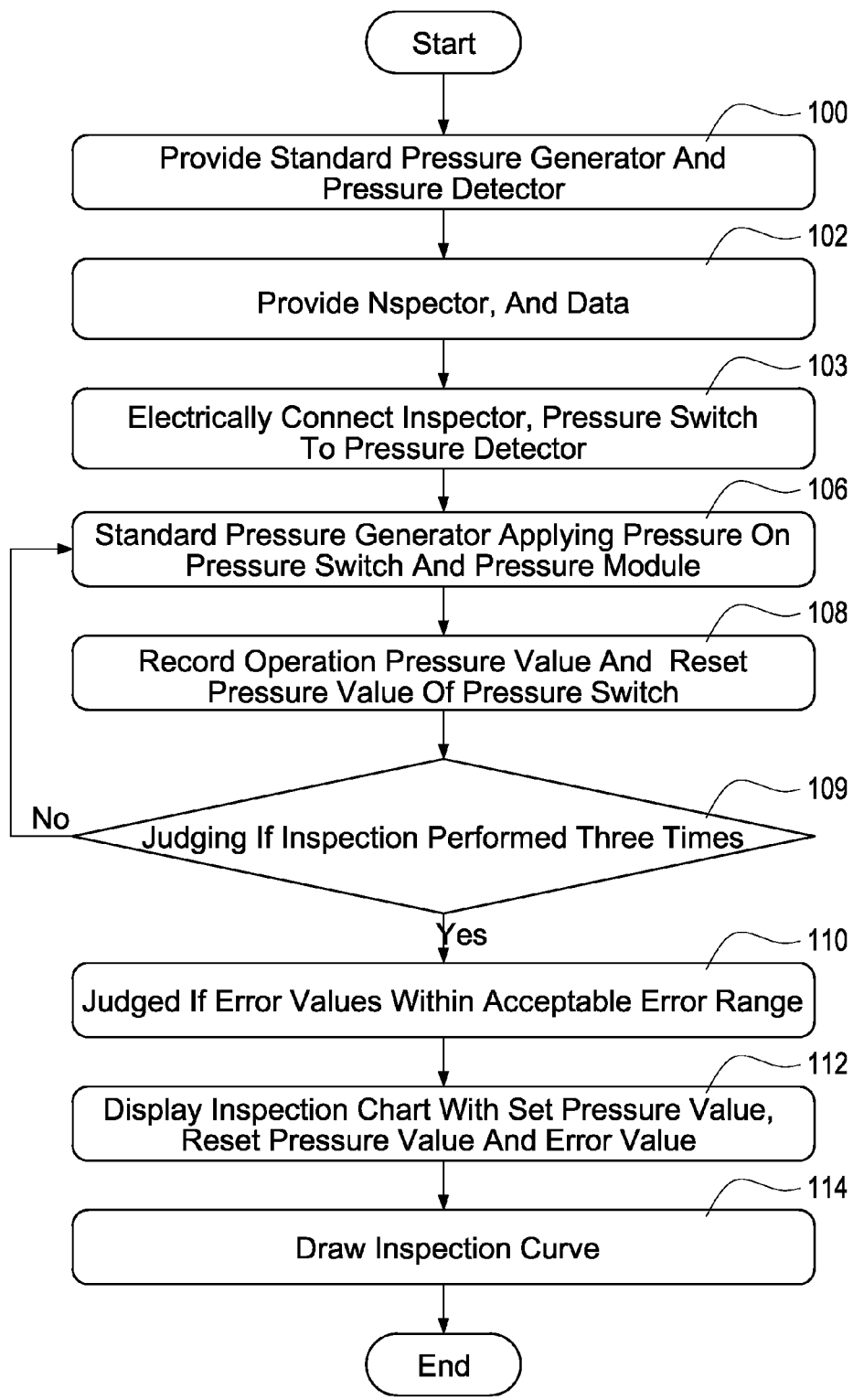
FIG. 1 is a flow chart schematic diagram of a method of inspecting a pressure switch according to the present invention.
Figure 2:
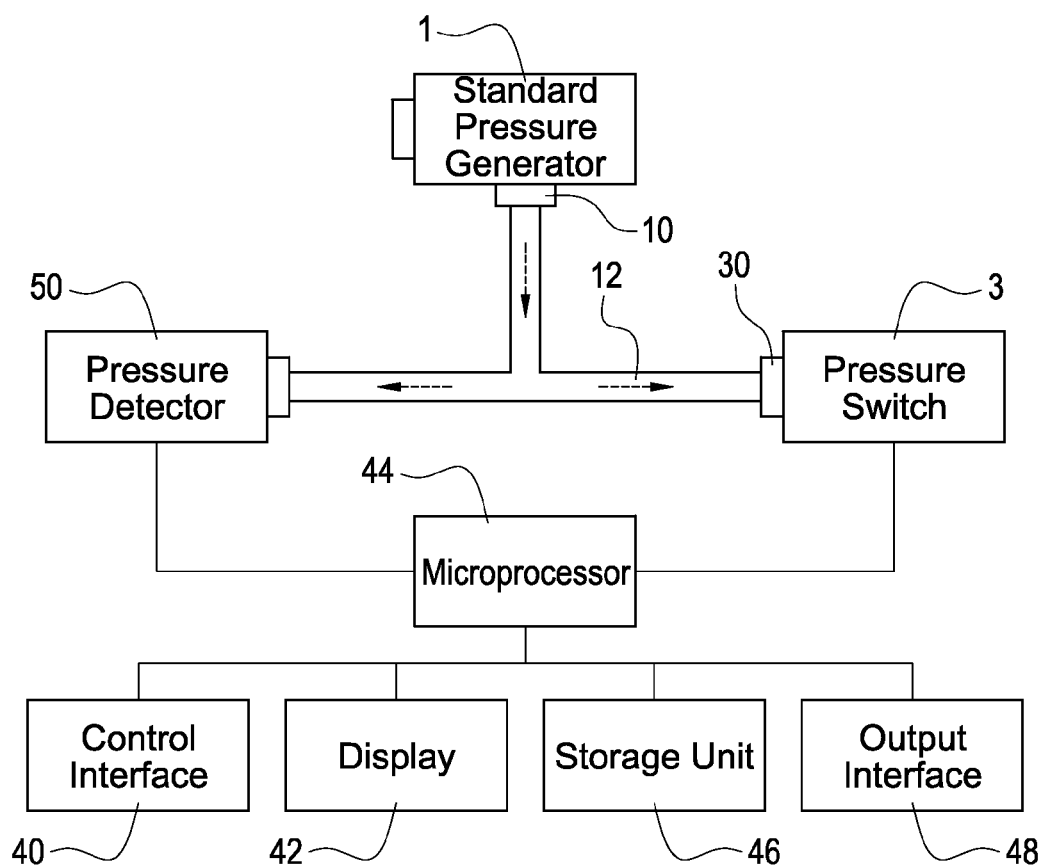
FIG. 2 is a connection schematic diagram among an inspector, a standard pressure generator, a pressure detector and a pressure switch according to the present invention.

Refer to FIG. 1 and FIG. 2, FIG. 1 is a flow chart schematic diagram of a method of inspecting a pressure switch according to the present invention; and FIG. 2 is a connection schematic diagram among an inspector, a standard pressure generator, a pressure detector and a pressure switch according to the present invention. As shown in FIG. 1, step 100 is providing a standard pressure generator 1 and a pressure detector 50. The standard pressure generator 1 can be for example a manual pump. As shown in FIG. 2, the standard pressure generator 1 comprises a pressure output end 10. The pressure output end 10 connects to a pressure shuttle 12. The other end of the pressure shuttle 12 connects to a pneumatic input 30 and a pressure detector 50 of a pressure switch 3. Thus, the pressure generated by the standard pressure generator 1 is delivered to the pressure switch 3 and the pressure detector 50.

Step 102 is providing an inspector 4, and creating basic data. The inspector 4 comprises an operating interface 40 and a display 42, As shown in FIG. 2, the operating interface 40 is comprised of a plurality of keys. An user is allowed to input basic data of the a pressure switch 3 to inspect via the operating interface 40. The above mentioned basic data at least comprises a setpoint, a pressure switch operation category and pressure unit. Of course, the above mentioned basic data comprise an apparatus number, an apparatus brand, a pressure unit and an acceptable error etc.

The display 4, for example, is a LCD display used for displaying a data screen 420 (as shown in FIG. 3). In the embodiment, the columns of the data screen 420 comprise an engineering name column 421, an apparatus number column 422, an apparatus category column 423, an apparatus brand column 424, a setpoint column 425, a detected input column 426, a pressure unit column 427, an operate category column 428, an operate condition column 429, an acceptable error column 430, an environment column 431 and a judge result column 432.

In addition, the display 42 can be used for displaying the inspecting result, wherein inspecting result comprises an inspection chart and an inspection curve. It should be noted that: in the embodiment, the operating interface 40 and the display 42 are respectively keys and a LCD display. In field application, the operating interface 40 and the display 42 can be integrated as a touch control panel.

It should be noted that: the above mentioned the pressure value of pressure switch 3 during operation is entered in the setpoint column. The operate category column is used for selecting the operation condition of the pressure switch 3. In general, the operation condition of the pressure switch 3 has two kinds, which are direct (INC) pressure switch and reaction (DEC) pressure switch. Direct pressure switch means that when pressuring reaches the setpoint, the pressure switch 3 is set, and reset after the pressure is decreased. Reaction pressure switch means that when pressuring exceeds the setpoint, the pressure switch 3 is set after the pressure is decreased to the setpoint, and reset after the pressure switch 3 is pressured again. When the pressure switch 3 is inspected, the setpoint and the operation condition are two most critical factors determining if the pressure switch 3 is qualified. Accordingly, the basic data of the data created in step S102 must comprises a setpoint and an operation condition of the pressure switch 3.

Refer to FIG. 2, the inspector 4 also comprises a microprocessor 44, a storage unit 46 and an output interface 48. The microprocessor 44 electrically connects to the control interface 40, the display 42, the storage unit 46 and the output interface 48. The data entered by the user via operating interface 40 is transferred to the microprocessor 44 and saved in the storage unit 46 to be referenced in the following steps.

Refer to FIG. 1, step S103 is electrically connecting the inspector 4, the standard pressure generator 1 to the pressure detector 50. The pressure detector 50 is used for detecting the immediate pressure value of the standard pressure generator 1, and transfers the immediate pressure value detected to the microprocessor 44, and saves in the storage unit 46.

In step S106, the standard pressure generator 1 applies pressure on the pressure switch 3 and the pressure detector 50. The standard pressure generator 1 slowly adjust the pressure applied to the pressure switch 3 and the pressure detector 50, so as to assure the pressure passes the point to set and the point to reset.

Step S108 is recording the set pressure value and the reset pressure value of the pressure switch 3, and calculate the errors between the set pressure value, the reset pressure value and the default pressure value. When the inspector 4 detects the set pressure value and the reset pressure value, the inspector 4 also records the immediate pressure value of the standard pressure generator 1. The immediate pressure value can also be saved in the storage unit 46.

Step S109 is judging if the inspection is performed three times. Thus, the inspection stability is effectively increased. If the inspection is not performed three times, the step moves back to step S106, the pressure switch 3 is pressured and inspected again. If the inspection is performed three times, the error values are analyzed and judged if the error values are within the acceptable error range (step S110).

In step S110, if the error values are within the acceptable range, "qualified" is entered in the judge result 432 column in the display 42 (as shown in FIG. 3); and if the error values are not within the acceptable range, "not qualified" is entered in the judge result 432 column in the display 42.

Moreover, before or after step S110, the inspection chart with the set pressure value, reset pressure value and error value (as shown in Table 1) can be displayed in the display 52 (step S112).

TABLE 1

| Serial number | set (mbar) | reset (mbar) | error (%) |
| --- | --- | --- | --- |
| 1 | 46.8 | 46.1 | −1.20% |
| 2 | 47.5 | 46.9 | −0.50% |
| 3 | 48.1 | 47.5 | 0.10% |

Lastly, step S114 is drawing an inspection curve with the set pressure value, the reset pressure value and the immediate pressure value (as shown in FIG. 4), and displays the inspection curve on the display 42. In FIG. 4, the operating pressure switch 3 is used as an illustration example, wherein the set pressure value of the pressure switch 3 is 48.1 mbar, and the reset pressure value is 47.5 mbar.

FIG. 5 is a schematic diagram of an inspection report of a pressure switch according to the present invention. As shown in the diagram: after the pressure switch 3 completes the inspection, the inspection person or the delegator is allowed to transfer the data to a printer, and print out a report 6 with an inspection chart and an inspection curve via the printer. In the diagram, the content in the report 6 of the pressure switch 3 at least comprises basic data 60, an inspection chart 62, an inspection curve 64 and testers.

As the skilled person will appreciate, various changes and modifications can be made to the described embodiment. It is intended to include all such variations, modifications and equivalents which fall within the scope of the present invention, as defined in the accompanying claims.

What is claimed is:

1. A method of inspecting pressure switch used for inspecting a pressure switch, the method comprising:
    a) providing a standard pressure generator and a pressure detector, the standard pressure generator connects to the pressure switch and the pressure detector;
    b) providing an inspector, and creating a plurality of data in the inspector, wherein the plurality of data comprises at least a setpoint pressure value and a pressure switch operation condition;
    c) electrically connecting the inspector, the pressure switch to the pressure detector;
    d) the standard pressure generator applying pressure on the pressure switch and the pressure module;
    e) recording a set pressure value and a reset pressure value of the pressure switch;
    f) calculating error values between the set pressure value, the reset pressure value and the default pressure value; and
    g) judging if the pressure switch is qualified according to the error value,
    wherein the method further comprises following steps after step f:
    f1) judging if the inspection performed three times;
    f2) after step f1, if the inspection not performed three times, the step moving to step d; and
    f3) after step f1, if the inspection performed three times, the step moving to step q, judging if the pressure switch is qualified according to the error values.

2. The method of inspecting pressure switch of claim 1, further comprising a step:
    h) displaying an inspection chart comprising the set pressure value, the reset pressure value and error values.

3. The method of inspecting pressure switch of claim 1, the method further comprising a step before step e:
    e0) recording an immediate pressure value of the standard pressure generator.

4. The method of inspecting pressure switch of claim 3, the method further comprising a step after step g:
    g0) drawing an inspection curve according to the set pressure value, the reset pressure value and the immediate pressure value.

5. The method of inspecting pressure switch of claim 4, the method further comprising a step:
    transferring the inspection chart and the inspection curve to a printer, and the printer printing out a report with the inspection chart and the inspection curve.

6. The method of inspecting pressure switch of claim 5, wherein the report comprises an engineering name, a judging result, basic data, an inspection chart and an inspection curve.

7. The method of inspecting pressure switch of claim 5, wherein the inspector comprises:
    a microprocessor, electrically connecting to the pressure switch and the pressure detector;
    a control interface, electrically connecting to the microprocessor and used for creating the plurality of data;
    a storage unit, electrically connecting to the microprocessor and used for saving the set pressure value, the reset pressure value, the error value and the plurality of immediate pressure values;
    a display, electrically connecting to the microprocessor, and used for displaying the inspection chart and the inspection curve; and
    an output interface, electrically connecting to the microprocessor, and used for outputting the inspection chart and the inspection curve.

8. The method of inspecting pressure switch of claim 1, wherein, upon the inspector creates data, the inspector displays the created data screen, columns in the created data screen comprise a engineering name column, an apparatus number column, an apparatus category column, an apparatus brand column, a setpoint column, a detected input column, a pressure unit column, an operate category column, an operate condition column, an acceptable error column and an environment column, the default pressure value is created in the setpoint column, the pressure switch operation condition is created in the operate category column.

* * * * *